United States Patent
Olds et al.

(10) Patent No.: US 8,327,093 B2
(45) Date of Patent: Dec. 4, 2012

(54) PRIORITIZING COMMANDS IN A DATA STORAGE DEVICE

(75) Inventors: Edwin Scott Olds, Norman, OK (US); Stephen R. Cornaby, Yukon, OK (US); Mark David Hertz, Oklahoma City, OK (US); Kenny Troy Coker, Mustang, OK (US)

(73) Assignee: Seagate Technology LLC, Cupertino, CA (US)

( * ) Notice: Subject to any disclaimer, the term of this patent is extended or adjusted under 35 U.S.C. 154(b) by 1552 days.

(21) Appl. No.: 10/970,424

(22) Filed: Oct. 21, 2004

(65) Prior Publication Data

US 2005/0055517 A1  Mar. 10, 2005

Related U.S. Application Data

(63) Continuation of application No. 10/121,901, filed on Apr. 12, 2002, now Pat. No. 6,826,630.

(60) Provisional application No. 60/322,492, filed on Sep. 14, 2001.

(51) Int. Cl.
*G06F 12/00* (2006.01)

(52) U.S. Cl. ............ 711/158; 711/4; 711/100; 711/111; 711/112; 711/113; 711/115; 711/143; 711/151; 710/5; 710/6; 710/36; 710/39; 710/40

(58) Field of Classification Search .................. 711/158, 711/4, 100, 112–115, 143, 151; 710/5–6, 710/36, 39, 40

See application file for complete search history.

(56) References Cited

U.S. PATENT DOCUMENTS

| | | | | |
|---|---|---|---|---|
| 3,925,766 | A | * | 12/1975 | Bardotti et al. ............... 710/244 |
| 4,394,733 | A | | 7/1983 | Swenson ....................... 364/200 |
| 5,440,698 | A | * | 8/1995 | Sindhu et al. ................ 709/225 |
| 5,465,343 | A | * | 11/1995 | Henson et al. ................ 711/112 |
| 5,515,521 | A | * | 5/1996 | Whitted et al. ................... 711/3 |
| 5,566,352 | A | * | 10/1996 | Wishneusky ................... 710/48 |
| 5,603,063 | A | * | 2/1997 | Au ................................. 710/52 |
| 5,634,068 | A | * | 5/1997 | Nishtala et al. ............... 711/141 |
| 5,644,786 | A | * | 7/1997 | Gallagher et al. ............. 710/30 |
| 5,664,143 | A | | 9/1997 | Olbrich ......................... 711/112 |
| 5,828,902 | A | * | 10/1998 | Tanaka et al. ................... 710/39 |
| 5,838,940 | A | | 11/1998 | Savkar et al. ................. 395/392 |
| 5,991,825 | A | | 11/1999 | Ng ................................... 710/6 |
| 6,092,158 | A | * | 7/2000 | Harriman et al. ............. 711/151 |
| 6,170,042 | B1 | * | 1/2001 | Gaertner et al. .............. 711/158 |
| 6,182,177 | B1 | * | 1/2001 | Harriman ...................... 710/112 |
| 6,272,600 | B1 | * | 8/2001 | Talbot et al. .................. 711/140 |
| 6,449,701 | B1 | * | 9/2002 | Cho .............................. 711/154 |

(Continued)

FOREIGN PATENT DOCUMENTS

EP  0354931 B1 *  4/1996

*Primary Examiner* — Tuan Thai
*Assistant Examiner* — Zhuo Li
(74) *Attorney, Agent, or Firm* — HolzerIPLaw, PC (57) ABSTRACT

A unique system and method for ordering commands may reduce disc access latency while giving preference to pending commands. The method and system involves giving preference to pending commands in a set of priority queues. The method and system involve identifying a pending command and processing other non-pending commands in route to the pending command if performance will not be penalized in doing so. The method and system include a list of command node references referring to a list of sorted command nodes that are to be scheduled for processing.

23 Claims, 7 Drawing Sheets

U.S. PATENT DOCUMENTS

| | | | |
|---|---|---|---|
| 6,510,497 B1 * | 1/2003 | Strongin et al. | 711/151 |
| 6,523,098 B1 * | 2/2003 | Anderson | 711/158 |
| 6,571,298 B1 * | 5/2003 | Megiddo | 710/5 |
| 6,574,676 B1 * | 6/2003 | Megiddo | 710/5 |
| 6,591,350 B1 * | 7/2003 | Stenfort | 711/158 |
| 6,795,936 B2 * | 9/2004 | Harris et al. | 714/42 |
| 2002/0002655 A1 * | 1/2002 | Hoskins | 711/112 |

\* cited by examiner

PRIORITIZING COMMANDS IN A DATA STORAGE DEVICE

RELATED APPLICATIONS

This application is a continuation of U.S. patent application Ser. No. 10/121,901, filed Apr. 12, 2002 now U.S. Pat. No. 6,826,630, which claims priority to U.S. provisional application Ser. No. 60/322,492, filed Sep. 14, 2001. The disclosure of each of these prior applications is incorporated herein by reference.

FIELD OF THE INVENTION

This application relates generally to command optimization in a data storage device and more particularly to effectively prioritizing read and/or write commands in a disc drive.

BACKGROUND OF THE INVENTION

Many data storage devices use microprocessors to execute commands. Typically, a data storage device can accommodate multiple microprocessor commands. For example, the microprocessor in a disc drive device may receive multiple commands to read or write data from or to media within the disc drive. When commands are received in a data storage device faster than the commands can be executed, the commands are typically buffered to await their turn for processing by the microprocessor in the data storage device. Additionally, data associated with a write command is typically held in a cache memory until the associated command is processed.

Performance in a data storage device can often be improved by executing the received commands in an order different from the order they were originally received. Ordering the commands in this manner is called command reordering. Command reordering allows for a more efficient use of the microprocessor as well as a more efficient use of the hardware being controlled by the microprocessor. For instance, a disc drive may receive commands to read and/or write data at a variety of locations on the hard discs within the disc drive. Ideally, these commands would be processed in a manner that would that would optimize user perceived performance.

There are a number of ways to order the commands in a command queue. Traditionally, disc drives have employed algorithms to sort commands in an order that minimizes seek time between the various commands. The seek time is the time required for the read/write element to radially move across or traverse cylinders between a current cylinder over which the read/write element is positioned and a target cylinder to be addressed in response to a particular command. However, seek time is only one of two components of the true access time of a command. Another component is the rotational latency time or the amount of time the disc drive spends waiting for the appropriate data to rotate under the read/write element. The rotational latency time may be a significant part of the total access time. Often, it is the dominant component of the total access time for relatively short seeks. As such, many current command ordering algorithms are optimized to reduce rotational latency, either alone or in conjunction with some form of seek time minimization.

One significant drawback associated with prior command ordering algorithms is that they do not give preference to pending commands in the reordering process. When a pending command is not given preference over non-pending commands, performance of the data storage device suffers. As used herein, a pending command is a command for which the command has not returned status. For example, a read command is pending until the host computer receives the data and status from the disc drive. As another example, a write command is pending until the disc drive notifies the host that the disc drive receives the data and sends completion status to the host. Hence, non-pending commands are those that the host computer perceives as complete, but are not completed in the data storage device.

An example of a non-pending command in the disc drive is a 'writeback' command. Frequently, when a disc drive receives a write command, the associated data is not immediately written to the disc, but rather it is cached until the write becomes favorable to commit to the media. When the write data is cached and completion status is sent to the host, the write command becomes a writeback command. Writeback commands are not pending because the host computer has been given notification that the associated data has been received by the disc drive. In other words, from the host computer's perspective, the write command has been completed; however, the disc drive still must execute the writeback command while it is cached.

As noted, traditional reordering algorithms do not give preference to pending commands in the reordering process. That is, these algorithms give the same priority to the pending command(s) as to the non-pending commands. Often the number of buffered non-pending commands exceeds the number of pending commands and the non-pending commands become more favorable to commit to the media. As a result, a pending command, for which the host computer requires prompt processing by the data storage device, may be delayed for a substantial amount of time while non-pending commands are processed. When pending commands are delayed, performance is reduced from the host computer's perspective. In particular, when the processing of pending commands is delayed, a computer user may perceive a lower level of data throughput between the host computer and the disc drive than if the pending commands are not delayed.

There is strong motivation in the industry to improve all aspects of performance, including throughput. Accordingly, there is a continual need for improvements in the art whereby pending commands and non-pending commands are executed in an efficient order while giving preference to pending commands, thereby reducing latency and improving performance.

SUMMARY OF THE INVENTION

Embodiments of the present invention minimize disc access latency using a unique system and method for ordering commands. More particularly, embodiments involve giving preference to pending commands in the priority queue. Still more particularly, embodiments involve identifying a pending command and processing other commands enroute to the pending command only if such processing will not delay the execution of the pending command.

An embodiment includes a method of prioritizing a plurality of commands involving storing a plurality of command nodes in memory, identifying a pending command node in the plurality of command nodes, and scheduling the pending command node for processing. More particularly, the method may employ steps of identifying intermediate command nodes in the plurality of command nodes that can be processed in addition to the pending command node within a predetermined amount of time and scheduling the intermediate command nodes before the pending command node.

The step of identifying intermediate command nodes may involve storing the plurality of command nodes in a first queue, and for each of the plurality of command nodes, determining an associated required processing time from a last scheduled command node. The method may further include sorting the plurality of command nodes according to their associated required processing times, selecting the one or more command nodes having an aggregated processing time which, when added to the processing time of the pending command, is less than the predetermined processing time.

These and various other features as well as advantages that characterize the present invention will be apparent from a reading of the following detailed description and a review of the associated drawings.

DETAILED DESCRIPTION

Embodiments of the present invention are described with reference to a series of figures. Generally, embodiments of the present invention relate to systems and methods incorporated in a data storage device for receiving commands from an attached host computer, ordering the commands according to the methods described herein, and processing the commands in a determined order. The systems and methods utilize a number of queues and a list of command node references to receive and sort command nodes and synchronize the processing of commands with the disc rotation to optimize performance as perceived by the host.

Figure 1:
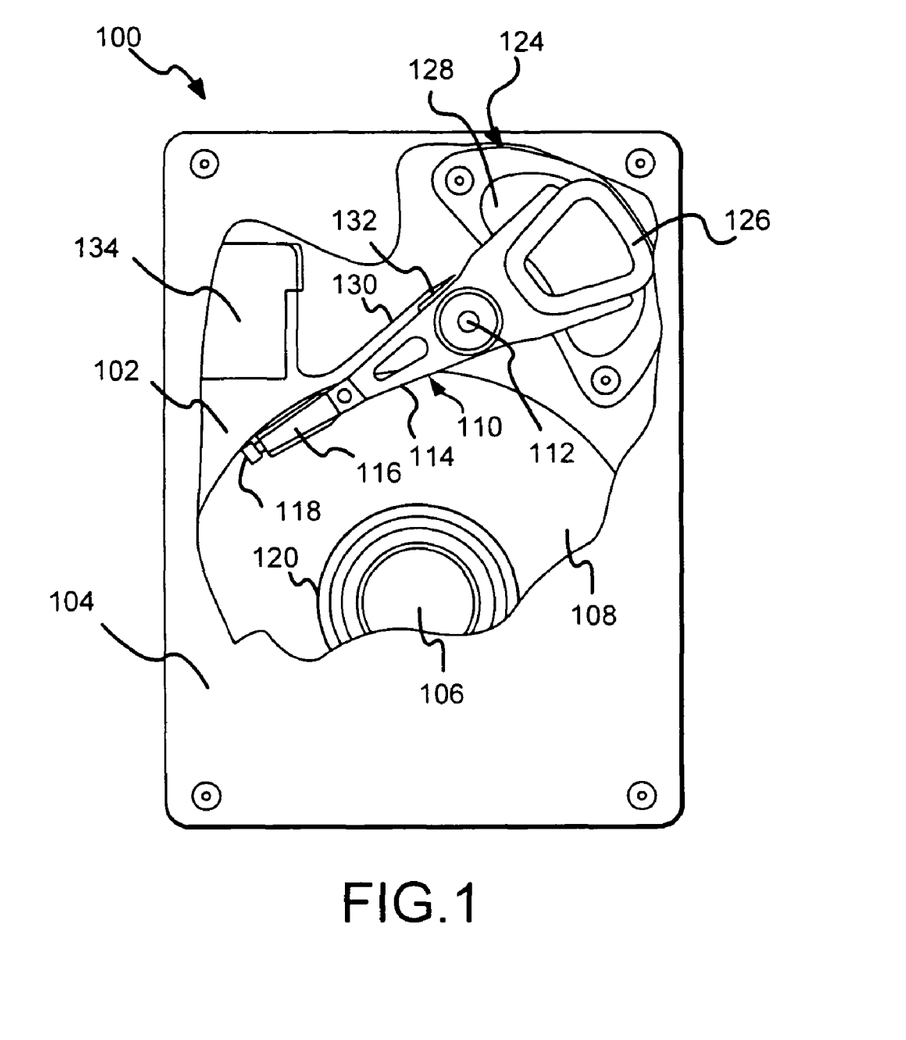
FIG. 1 is a plan view of a disc drive incorporating an embodiment of the present invention.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 that rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 that extend towards the discs 108, with one or more flexures 116 extending from each of the actuator arms 114. Mounted at the distal end of each of the flexures 116 is a head 118 that includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 that establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108. The heads 118 are positioned over one or more tracks 120 containing data and servo information for controlling the position of the heads 118.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
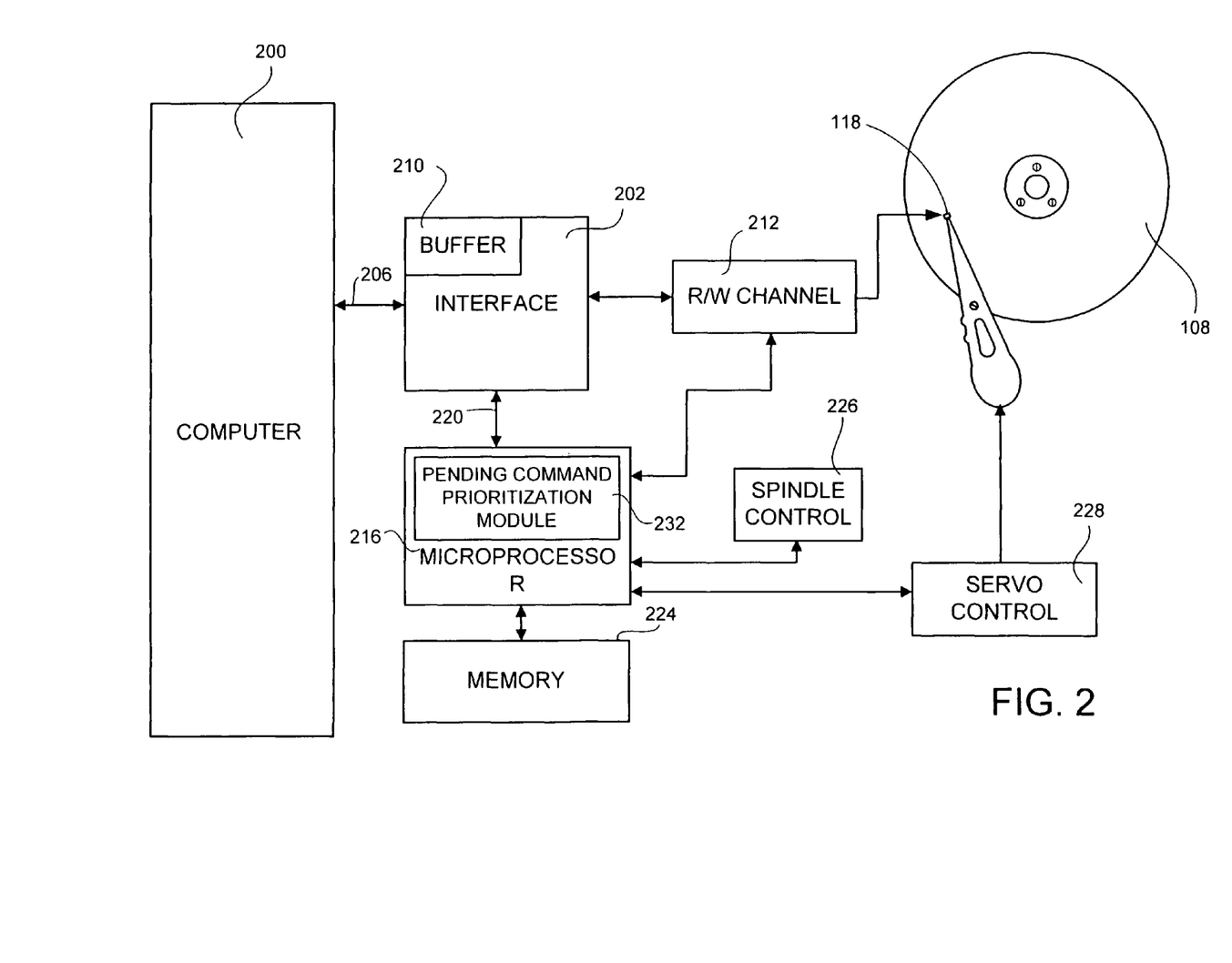
FIG. 2 is a simplified functional block diagram of the disc drive shown in FIG. 1.

FIG. 2 is a functional block diagram of the disc drive 100 of FIG. 1, generally showing the main functional circuits that may be resident on a disc drive printed circuit board for controlling the operation of the disc drive 100. As shown in FIG. 2, a host computer 200 is operably connected 206 to an interface application specific integrated circuit (interface) 202. The interface 202 typically includes an associated buffer 210 that facilitates high speed data transfer between the host computer 200 and the disc drive 100. The buffer 210 is a cache memory for caching commands and/or data to reduce disc access time. Data to be written to the disc drive 100 are passed from the host computer to the interface 202 and then to a read/write channel 212, which encodes and serializes the data and provides the requisite write current signals to the heads 118. To retrieve data that has been previously stored by the disc drive 100, read signals are generated by the heads 118 and provided to the read/write channel 212, which performs decoding and error detection and correction operations and outputs the retrieved data to the interface 202 for subsequent transfer to the host computer 100. Such operations of the disc drive 100 are well known in the art and are discussed, for example, in U.S. Pat. No. 5,276,662 to Shaver et al.

As also shown in FIG. 2, a microprocessor 216 is operably connected 220 to the interface 202. The microprocessor 216 provides top level communication and control for the disc drive 100 in conjunction with programming for the microprocessor 216, which may be stored in a non-volatile microprocessor memory (MEM) 224. The MEM 224 may include random access memory (RAM), read only memory (ROM) and other sources of resident memory for the microprocessor 216. Additionally, the microprocessor 216 provides control signals for spindle control 226 and servo control 228. The embodiment illustrated in FIG. 2 includes a pending command prioritization module (PCPM) 232 being executed by the microprocessor 216. The PCPM 232 is executable code initially resident in the MEM 224 and read and executed by the microprocessor 216 to perform unique operations to prioritize commands giving preference to pending commands.

In operation, the host computer 200 sends commands to the disc drive 100 instructing the disc drive 100 to read or write data from or to the discs 108. A "write" command typically includes data to be written to the discs 108 along with a logical address indicating where the data is to be written and the number of bytes to write. A "read" command typically includes a logical address indicating the location or locations of data to be read, and a size indicator indicating the number of bytes to be read. The commands are received by the interface 202, where they may be processed immediately or stored for later processing. The interface 202 may store the commands and their associated data and/or addresses so that the commands can be sorted, ordered, or prioritized in such a way that disc drive 100 performance may be improved. In one embodiment, the commands received from the host 200 are first sorted according to required processing time irrespective of command type. In this embodiment, the commands are subsequently prioritized based on command type with preference to pending commands.

As used herein, pending commands are commands that are recognized by the host computer 200 as not yet processed by the disc drive 100. An example of a pending command is a pending read command. During a typical read operation, the host computer 200 sends a command to the disc drive 100 requesting the disc drive 100 to send the host 200 data that has been written to the disc drive 100. The host 200 then waits for the disc drive to return the requested data. As such, until the requested data is delivered to the host 200 from the disc drive 100, the command is pending. In contrast to a pending read command, a 'writeback' command is a command that is not considered a pending command. A writeback command is a command that is internal to the disc drive 100 that prompts the disc drive 100 to write previously cached data to the discs 108. A writeback command is not pending from the host computer 200 perspective, because the host computer 200 considers the data associated with the writeback command to have already been written.

To improve performance, it is often desirable to process the host commands in an order different from the order in which they are received. As is described below, embodiments of the present invention include unique methods and systems of prioritizing commands depending on the type of command, and giving pending commands a higher priority than non-pending commands.

Methods of prioritizing commands with preference to pending commands to improve disc drive 100 performance are described in detail below with reference to FIGS. 4-7. In one embodiment (illustrated in FIG. 2), the microprocessor 216 executes software resident in the memory 224 to carry out the methods. In another embodiment, the methods are performed by the interface 202. Many other embodiments not shown herein will be readily apparent to those skilled in the art to implement the various embodiments and features of the present invention. As will be understood, the various embodiments of the methods described herein may be implemented in any combination of hardware, software, or firmware.

In the various embodiments described herein, commands from the host computer 200 are represented in the disc drive 100 by "command nodes." When a command is received by the disc drive 100, a command node is created that has information (described in detail below) including references to other command node(s) for logically arranging command nodes in an order that optimizes disc drive 100 performance. Command nodes are maintained and ordered in one or more command node queues. Commands from the host 200, and hence command nodes, have associated disc locations that are to be accessed to read or write data from and to the discs 108.

Ordering the command nodes in the queues is based in part on the disc locations, because the disc locations largely determine the time required to process the command nodes.

Figure 3:
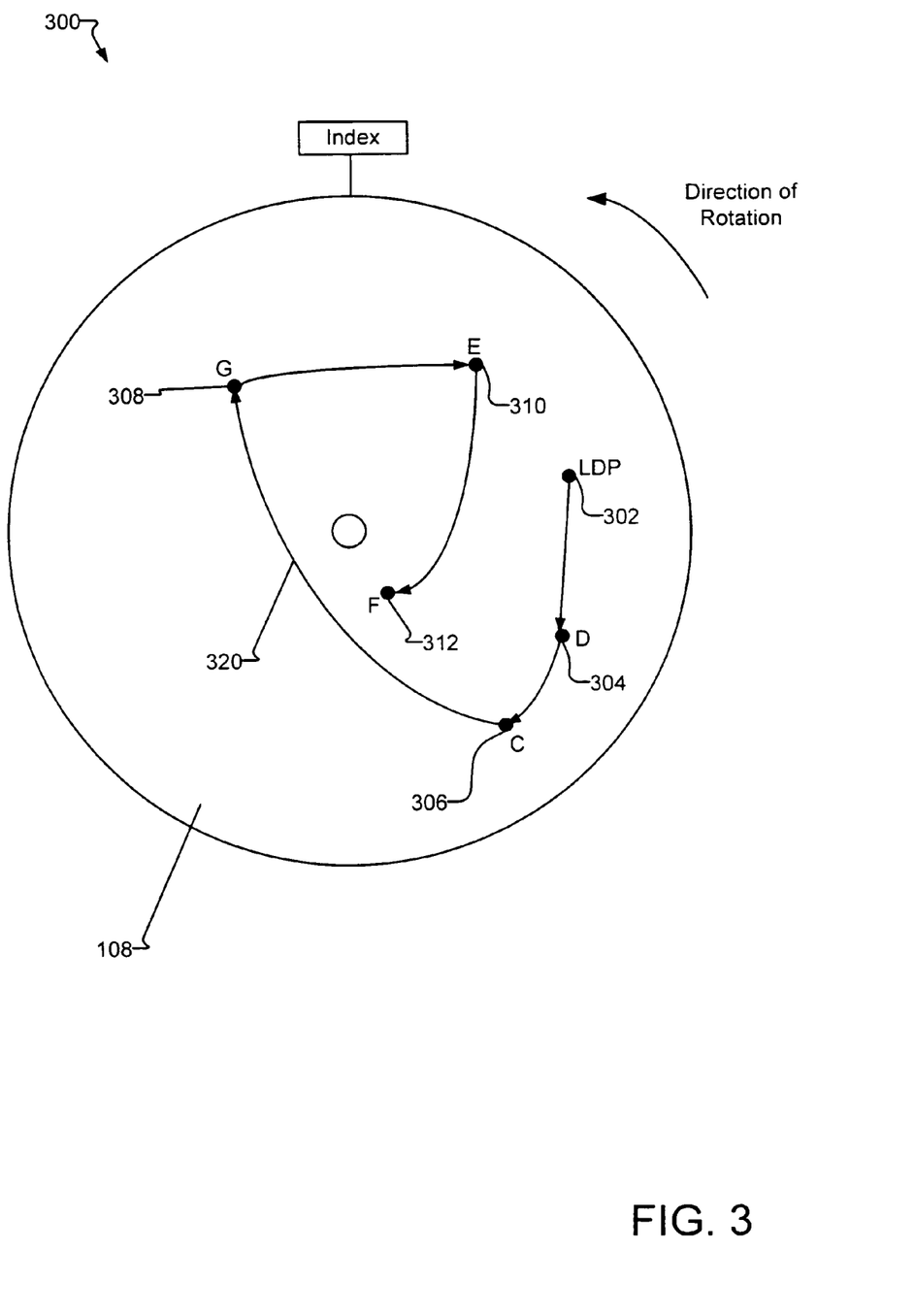
FIG. 3 is an elevation view of a disc showing disc locations that may be accessed in response to commands using Rotational Position Sorting (RPS).

FIG. 3 is an elevation view of a disc 108 showing disc locations that may be accessed in response to commands using a rotational position sorting (RPS) algorithm to sort commands in a command node queue. Six exemplary disc locations, last disc position (LDP) 302, D 304, C 306, G 308, E 310, and F 312, are illustrated at various positions around a disc 108. To illustrate, it is assumed that disc locations D 304, C 306, G 308, and E 310, are associated with writeback commands (i.e., non-pending commands). It is further assumed that disc location F 312 is associated with a read command (i.e., a pending command). Using basic RPS, the read command associated with the disc location F 312, is not given any preference in the prioritization process. Rather, the basic RPS algorithm gives all of the commands the same relative priority, without regard to a command's status as pending or non-pending. The basic RPS algorithm schedules disc accesses based solely on the time latency to access the locations associated with the commands. As a result, the writeback commands associated with disc locations D 304, C, 306, G 308, and E 310, are scheduled prior to the read command associated with disc location F 312, as is indicated by sequencing arrows 320.

The exemplary situation illustrated in FIG. 3 is not optimal, primarily because the read command associated with location F 312 is delayed in time in favor of the writeback commands, even though the host 200 considers the read command to be pending and does not consider the writeback commands to be pending. In other words, the writeback commands associated with locations D 304, C 306, G 308, and E 310, are considered to have been completed from the host computer's perspective, whereas the read command associated with disc location with F 312 has not been completed. Because the basic RPS algorithm does not base command priority on the type of command (pending or non-pending), disc drive performance is adversely impacted as, as described above. Embodiments described in FIGS. 4-7 base command prioritization on disc location as well as command type to prioritize command nodes in queues of the disc drive 100.

Figure 4:
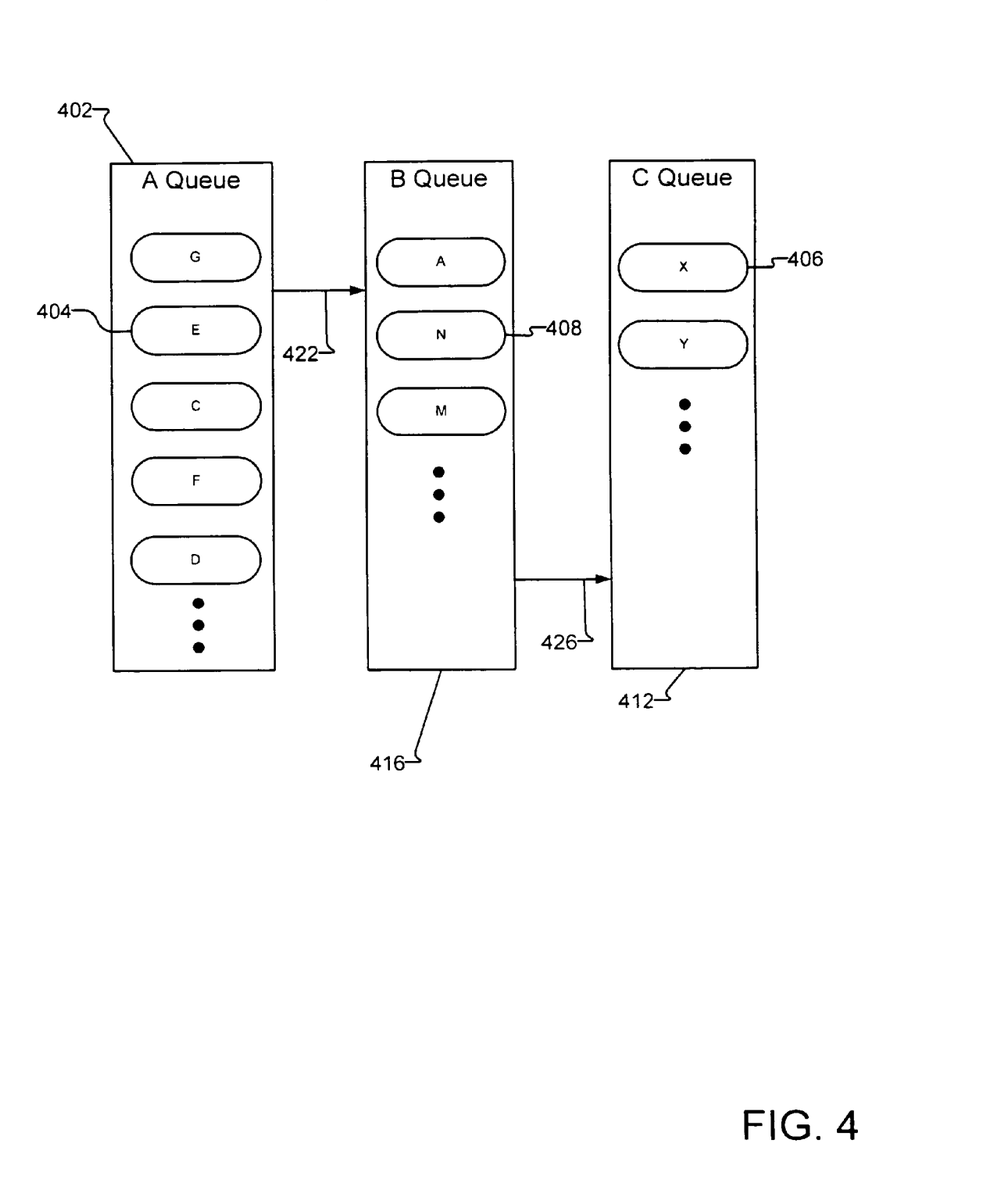
FIG. 4 illustrates a set of queues that are used in accordance with an embodiment of the present invention.

FIG. 4 illustrates a set of queues that are utilized by the pending command prioritization module 232 to prioritize commands with preference to pending commands in an embodiment of the present invention. In this exemplary embodiment, an 'A' queue 402 holds new command nodes 404 representing commands that have recently been received from the host 200 (FIG. 2). As is discussed in more detail below, a 'B' queue 416 holds command nodes 408 while they are sorted and selected for scheduling. As is also discussed in more detail below, a 'C' queue 412 holds command nodes 406 that are scheduled for disc access. Before describing in detail how the A, B, and C queues (402, 416, and 412, respectively) are used by the pending command prioritization module 232, the content and format of command nodes (e.g., 404, 406, and 408) will now be described.

As described, commands are represented in the disc drive 100 by command nodes, such as the command node 404. For illustrative purposes, the content and format of command node 404 are described here, but the described content and format of command nodes 404 applies equally to the command nodes 406 and 408. Command nodes 404 typically include a number of fields containing data relevant to specific commands and specific systems. For example, a command node for a disc drive, such as disc drive 100, may include fields that specify the buffer address of the information to be transferred, the transfer length of the information to be transferred, the start of the logical block address (LBA) issued or requested by the host computer 200 (FIG. 2), the start of the physical cylinder where data is to be written/read, the start of the physical head, the start of the physical sector/starting wedge where data is to be written/read, the end of the physical cylinder where data is to be written/read, the end of the physical head, the end of the physical sector/starting wedge where data is to be written/read, and the end of the physical cylinder where data is to be written/read. Additionally, each command node 404 preferably includes fields for a previous link pointer and fields for a next link pointer. In one embodiment, the logical order of the command nodes 404 is defined by the previous link and next link pointers. For example, in one embodiment, the queue 402 is arranged as a doubly linked list of command nodes 404.

A command node 404 will also typically include a field for specifying what type of command (read, write, etc.) is to be executed in relationship to the command node 404. For example, the command node 404 may include a field for control flags that specify the command associated with the command node 404. The structure of the command node 404, that is, the number of fields and the types of data that are required in the fields, is dependent on the types of commands executed by the system and by the type of system employing the pending command prioritization module 232, such as a SCSI device or an AT device. The structure of the command node 404 is preferably set at the compile time of the pending command prioritization module 232. It should be understood that the command node 404 illustrates but one example of the configuration and contents of a command node for a disc drive device. Any number of different command node configurations and contents may be used in accordance with the various embodiments described herein, depending on the environment or application in which or for which the pending command prioritization system may be used or employed.

When a new command is sent from the host computer 200 to the disc drive 100, it is assigned a command node 404 in the A queue 402. Command nodes in the A queue 402 will be routed to the B queue 416 where they will be sorted and prioritized.

Data associated with write commands is received from the host computer and cached before the write command node is put in the B queue 416. While the data associated with the write command is being received and cached, the write command node is temporarily buffered. In one embodiment, the write command is temporarily buffered in the C queue 412. In another embodiment, the write command node is temporarily buffered in another memory independent from the A, B, and C queues (402, 412, and 416). While a write command node is temporarily buffered, data associated with a write command node is transferred from the host 200 to the buffer 210 (FIG. 2). After data associated with the write command node is transferred from the host 200 to the buffer 210, the write command node is moved to the B queue 416 and the disc drive 100 notifies the host 200 that the write command has been completed. After the host 200 is notified of the completion, the write command node is no longer a pending command and is referred to as a writeback command node. As previously described, the term 'writeback' indicates that the data associated with a write command still resides in the buffer 210 that must be written to the disc 108.

The command nodes 404 that get routed directly from the A queue 402 to the B queue 416 represent commands for which no interim processing is required, and can be immediately sorted for scheduling. Examples of command nodes that are routed directly from the A queue 402 to the B queue 416 are write command nodes with no cache (i.e., non-cache write command nodes) and read command nodes. All command nodes 408 (e.g., read, write, and writeback command nodes) in the B queue 416 will be sorted and selected for scheduling based both on the disc locations associated with the command nodes and the type of command node 408. Command nodes 408 in the B queue 416 are sorted according to the required processing time from a last scheduled command in the C queue 412. In one embodiment, the command nodes 408 in the B queue are sorted using a basic RPS sort algorithm.

After commands nodes 408 in the B queue 416 are sorted, one or more of the command nodes 408 may be scheduled for disc access. Commands nodes 408 in the B queue 416 are scheduled by routing 426 them to the C queue 412. When a scheduled command node 406 is in the C queue 412, the command node 406 is executed in the order it was scheduled. After the scheduled command node 406 is executed, the command node 406 is removed from the C queue 412. For example, if the command node 406 represents a writeback command, after the associated writeback data in the buffer 210 is written to the disc 108, the writeback command node 406 is eliminated from the C queue 412.

The A queue 402 and the C queue 412 are preferably first-in-first-out (FIFO) buffers storing sequences of new command nodes 404 and scheduled command nodes 406, respectively. The commands nodes are ordered in the queues logically, and it is to be understood that the commands nodes may be physically located anywhere in memory in the disc drive 100. The commands nodes may be logically arranged in the queues using any means known in the art, including arrays and/or linked lists.

Figure 5:
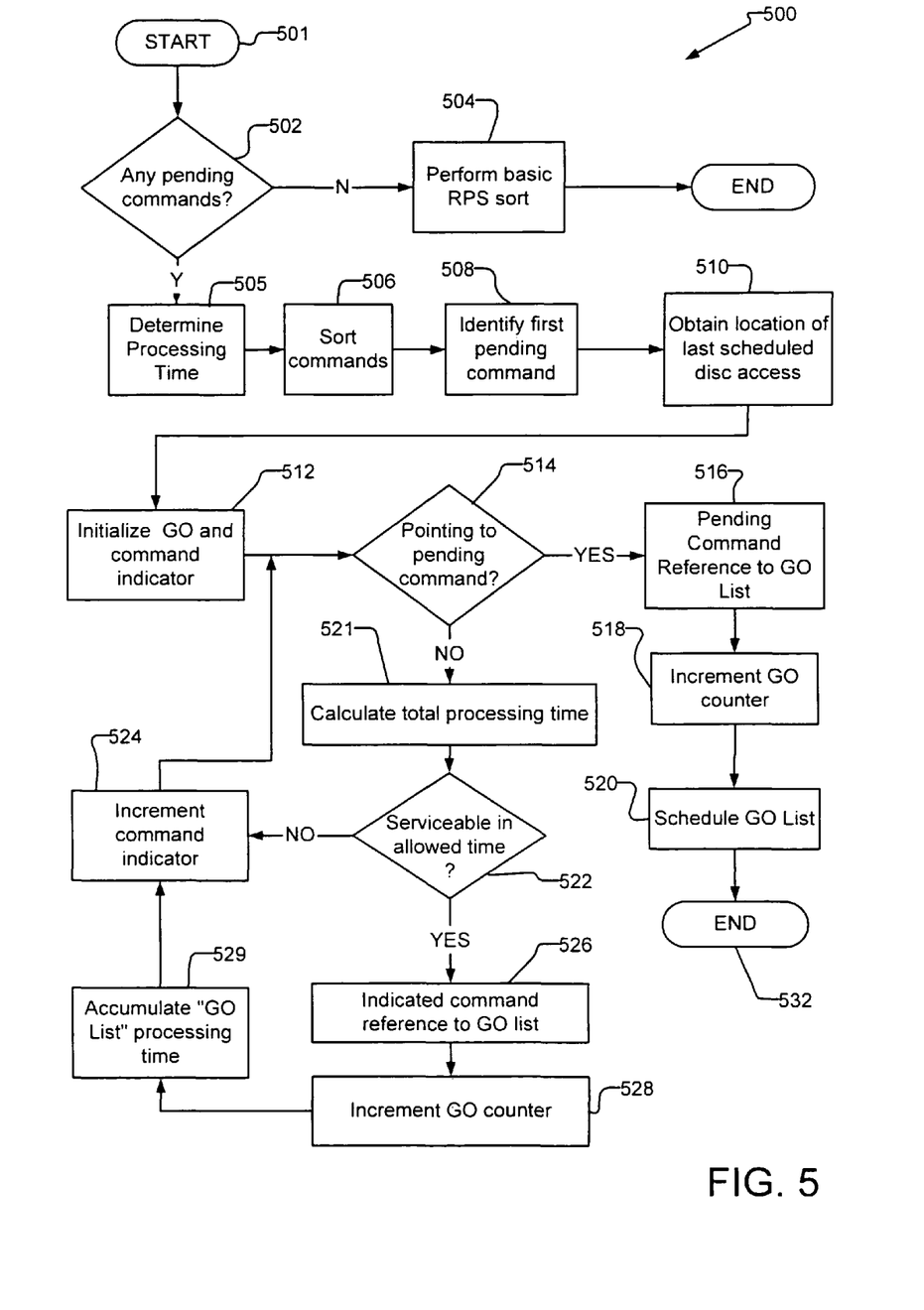
FIG. 5 is a flow chart of a pending command prioritization operation in accordance with an embodiment of the present invention.

FIG. 5 is an operational flow 500 illustrating various operations that are implemented by the PCPM 232 in carrying out command prioritization in accordance with an embodiment of the present invention. Generally, the operational flow 500 schedules queued command nodes based both on command type (e.g., pending and non-pending) as well as disc locations associated with the command nodes. More particularly, the operational flow 500 schedules a pending command node along with any other command nodes that can be performed in an allowable time before the pending command node. The operational flow 500 utilizes one or more queues, such as the A, B, and C queues (402, 416, and 412, respectively of FIG. 4).

As shown in FIG. 5, following a start operation 501 of the operation flow 500, a querying operation 502 determines whether any pending commands exist. Preferably, the querying operation 502 checks any command nodes in the B queue 416 to determine if they are pending. If it is determined by the querying operation 502 that no pending commands exist, an RPS sort operation 504 executes a basic Rotational Position Sort (RPS).

In the RPS sort operation 504, the buffered command nodes are sorted according to their positions on the disc 108 (FIG. 2). The RPS sort operation 504 may use any RPS algorithm known in the art. The RPS sort operation 504 generally determines how long it will take to process the commands in the B queue 416, taking into account a number of latencies, including, but not limited to, the rotational latency, the seek time, and the disc access time. After completion of the RPS sort is operation 504, the operational flow 500 ends. The querying and performing operations, 502 and 504, generally save processing time in the operational flow 500, by avoiding subsequently described steps if there are no pending commands in the B queue 416. As such, these operations are performed in a preferred embodiment. However, in other embodiments, the querying and performing operations, 502 and 504, may not be included and the operational flow 500 may begin at determining operation 505 rather than querying operation 502.

If it is determined in the querying operation 502 that pending commands do exist in the B queue 416, or if the querying and performing operations 502 and 504 are omitted from the operational flow 500, a determining operation 505 determines a processing time required to process each command in the B queue 408 from the last scheduled command node 406 in the C queue 412. A sorting operation 506 then sorts the commands in the B queue 416 according to the determined processing times calculated in the determining operation 505. The processing times determined in the sorting operation 506 may be based on a multitude of latency values, including, but not limited to, the rotational latency, seek time, sequencer latency, and disc access time. The processing time associated with a waiting command node 408 is generally a function of the node's associated position (e.g., disc location F 312 of FIG. 7) to be accessed on the disc 108, as well as a previously accessed position (e.g., the LDP 302 of FIG. 7) on the disc 108. The LDP 302 is the last sector, in a set of sectors, of the last scheduled command node 406 (FIG. 4) in the C queue 412 (FIG. 4). In addition, the processing time depends on mechanical and electrical tolerances of the components in the disc drive 100 (FIG. 1), and thus will vary from model to model. Any sorting algorithm known in the art may be used in the sorting operation 506, including a basic RPS.

Generally, the determining operation 505 iteratively steps through each command node 408 in the B queue 416 and determines a processing time associated with each wait command node 408. The processing time is generally the amount of time to process the command node 408 after processing the last scheduled command node 406 in the C queue 412. The sorting operation 506 then compares the determined processing time with the processing time of an adjacent waiting command node 408. If the first processing time is greater than the next processing time, the sorting operation 506 swaps the queue position of the first command node 408 in the B queue 416 with the queue position of the adjacent command node 408 in the B queue 416. Many other algorithms are envisioned that fall within the scope of the determining operation 505 and the sorting operation 506.

After the command nodes in the B queue 304 are sorted in the sorting operation 506, an identifying operation 508 identifies a first pending command in the B queue 416. The identifying operation 508 checks each command node in the B queue 416 for its associated command type. The identifying operation 508 may be an iterative looping process, wherein each command node of the B queue 416 is iteratively tested for its command type, and the location of the first command node that is of a pending command type is stored in a 'pendstart' variable for future use in the operational flow 500. In one embodiment, if the associated command type is either a write command with no cache or a read command, the command is identified as a pending command. Because the command type may be frequently checked during the operational flow 500, the command type is preferably stored in a format that is quickly accessible and testable. In one embodiment, each of the command types is defined as a word with a unique bit asserted (e.g., set to a value of '1'). In this format, testing the command type can be implemented quickly in a bit masking operation, which is relatively fast for the microprocessor 216. Other formats will be readily apparent to those skilled in the art.

After the first pending command is identified by the identifying operation 508, an obtaining operation 510 obtains the disc location associated with the last scheduled command node 406. The last scheduled command node 406 is the most recently scheduled command node in the C queue 412. The obtaining operation 510 uses the last scheduled command node 406 to determine an associated physical location on the disc 108. For example, if the last scheduled command node 406 represents a read command, the location (e.g., LDP 302 in FIG. 7) to be read on the disc 108 is determined. In the example, the determination may be made by reading a Logical Block Address (LBA) value associated with the read command node 406, and/or determining an associated Cylinder Head Sector (CHS) position on a disc 108. The obtaining operation 510 obtains the calculated CHS value and may store it to be used later in the operational flow 500. Following the obtaining operation 510, an initializing operation 512 then initializes an indicator variable that is used to index the command nodes in the B queue 416. In the initializing operation 512, the indicator variable is set to 'point to' the first command node in the B queue 412.

In one embodiment, a command node reference list, called a "GO List", is utilized to schedule command nodes in the B queue 416 to the C queue 412. How the "GO List" is used is discussed in more detail in the description of FIG. 6. Referring to the initializing operation 512, the "GO List" is initialized along with a "GO List" counter, and an accumulated "GO List" processing time value. As is discussed below in further detail, the "GO List" is a temporary array or buffer that holds references to the command nodes that will be scheduled for disc access. Preferably the initialization operation 512 clears the "GO List" of any command node references and sets a "GO List" counter equal to zero in preparation for an iterative process of identifying commands in the B queue 416 that can be processed in an allowable time. The accumulated "GO List" processing time value is set equal to zero in the initializing operation 512. The commands that can be processed in the predetermined allowable time will be scheduled using the "GO List." After the indicator variable and the "GO List" data are initialized, a querying operation 514 determines whether the command node indexed, or pointed to, by the indicator is a pending command. To determine whether the command node is a pending command, the command type is tested. In one embodiment, the command type is tested using bit-masking techniques described with respect to the identifying operation 508.

In another embodiment of the querying operation 514, the indicator variable is compared to the 'pendstart' variable that was stored in the identifying operation 508. If it is determined that the indicator is pointing to a pending command node, a creating operation 516 creates a reference to the pending command node in the "GO List." In the creating operation 516, a reference to the pending command node is stored in the "GO List." An incrementing operation 518 then increments by one to keep track of the number of command node references in the "GO List." A scheduling operation 520 then schedules the command nodes that are referenced by the "GO List." The scheduling operation 520 copies any command nodes referenced by the "GO List" from the B queue 416 into the C queue 412 at a position following the last scheduled command node 406 in the C queue 412.

If there is only one command node (i.e., the pending command node) referenced by the "Go List", the command node is copied into the C queue 412 from the B queue 416. As will be shown, the "GO List" may contain command node references (e.g., reference 620 in FIG. 6) in addition to the pending command node reference. If there is more than one command node reference in the "GO List" (i.e., non-pending command nodes ahead of the pending command node), the scheduling operation 520 schedules the pending command node last.

After the command nodes referenced by the "GO List" are scheduled, the operational flow 500 ends at ending operation 532.

If, in the querying operation 514, it is determined that the command indicator is not referencing a pending command, a calculating operation 521 calculates how long it will take to process the pending command (identified in the identifying operation 508) from the last scheduled command. The calculating operation 521 preferably sums the seek time, rotational latency, disc access time, and all other relevant latencies associated with moving from the disc location associated with the last scheduled command to process the pending command.

In one embodiment, the GO List processing time includes the processing time from the tail of the last scheduled command through the last command referenced in the GO List. The calculating operation 521 first calculates the time to service the identified command from the tail of the last command in the GO list (or last scheduled disc access if the GO list is empty). The calculating operation 521 then calculates the time to service the pending command from the tail of the identified command. The calculating operation 521 then adds to the existing GO list processing time to the two processing times previously calculated to obtain a total processing time if the indicated command is processed before the pending command. After the calculating operation 521, another querying operation 522 determines whether the indicated command, the pending command, and all the commands referenced by the GO List can be processed within a predetermined allowed time. If the total processing time is greater than the allowed time value, the command will not be scheduled prior to the pending command. However, if the total command processing time is not greater than the predetermined allowed time, the command will be scheduled prior to the pending command.

In one embodiment, the predetermined allowed time used in the querying operation 522 is selected when the disc drive 100 is designed and/or manufactured. The allowed time value is based on the desired level of performance of the disc drive 100. In particular, the throughput of the disc drive will largely depend on the selected allowed time. In one embodiment, the allowed time value is represented by a number of allowable "skipped revolutions." In this embodiment, the total processing time is also represented in "skipped revolutions" for ease of comparison in the querying operation 522. The number of skipped revolutions associated with a command refers to the number of disc 108 rotations that will occur before the command can be executed (i.e., before the disc location associated with the command can be accessed). Generally, a higher number of skipped revolutions for a command corresponds to a higher rotational latency. Therefore, a designer may reduce rotational latency by selecting a lower value (a minimum of zero) for the allowed skipped revolutions.

In one embodiment, the predetermined allowed time is a user selectable option through a mode page that is dependent upon the type of workload that the disc drive 100 is operating under. In this embodiment, the user is able to adjust the predetermined allowed time based on perceived performance in order to improve performance. In another embodiment, the predetermined allowed time is an automatically set value based on workload. The disc drive 100 in this embodiment is operable to calculate performance or recognize a particular mode of disc access and automatically change the predetermined allowed time accordingly to optimize performance.

If, in the querying operation 522, it is determined that the total command processing time is greater than the allowed time, an incrementing operation 524 increments the command indicator to reference the next command node in the B queue 416. In a preferred embodiment, the command nodes are retained in an array indexable by the command indicator. In this embodiment, the next command node may be referenced simply by incrementing the command indicator by one. After the incrementing operation 524 updates the command indicator, the querying operation 514 again determines if the command indicator is referencing a pending command as described above.

If it is determined in the querying operation 522 that the indicated, pending, and GO List commands can be processed within the allowed time, a creating operation 526 creates a reference to the indicated command node in the "GO List." After the command node reference is stored in the "GO List," an incrementing operation 528 increments a "GO List" counter that monitors the number of command node references in the "GO List." After the "GO List" counter is incremented, an accumulating operation 529 updates the accumulated processing time value (initialized in the initializing operation 512) that holds the accumulated processing time of all command nodes referenced in the "GO List" up to the indicated command. The accumulating operation 529 adds the command node processing time of the reference just created in the "GO List" to the accumulated processing time value that was initialized in the initializing operation 512.

After the accumulating operation 529, the incrementing operation 524 increments to the next command node in the B queue 416. The operational flow 500 iterates through the loop of operations 514, 521, 522, 526, 528, and 524 to create a "GO List" that contains at least one pending command node reference. The "GO List" may also contain one or more non-pending command node references. When the scheduling operation 520 moves the command nodes from the B queue 416 to the C queue 412, the non-pending command nodes are placed ahead of the pending command node in the C queue 412.

The operational flow 500 is executed repeatedly during operation of the disc drive 100 (FIG. 1). The frequency of execution is implementation specific. In one embodiment, the operational flow 500 is a task that is scheduled and executed by an operating system running on the microprocessor 216 (FIG. 2). In another embodiment, the operational flow 500 is interrupt driven, wherein the frequency of interrupts is determined by an external source, such as receipt of a command from the host 200. In another embodiment, an interrupt may be generated when a new command node is inserted in the B queue 416. Other implementations are envisioned that fall within the scope of embodiments of the present invention.

Figure 6:
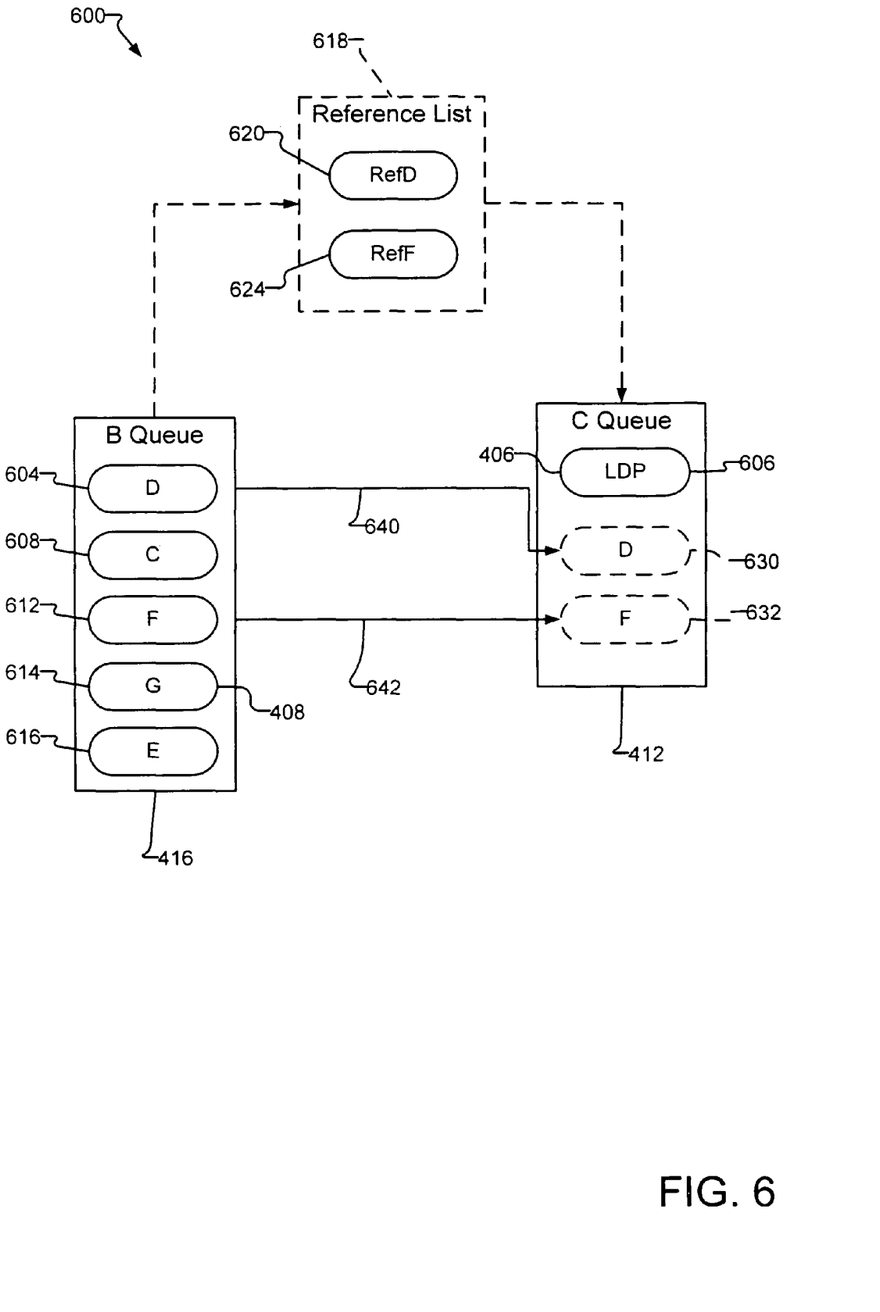
FIG. 6 depicts exemplary scheduling and routing of command nodes in a data storage device utilizing an embodiment of the pending command prioritization operations illustrated in FIG. 5.

Turing now to FIG. 6, depicted therein are exemplary command nodes in the B queue 416 being scheduled and routed to the C queue 412 utilizing an embodiment of the operational flow 500 illustrated in FIG. 5. For illustrative purposes, FIG. 6 is described in conjunction with FIG. 7, which shows exemplary disc locations associated with the command nodes of FIG. 6. Each command node 604, 606, 608, 612, 614, and 616 has a corresponding disc location 304, 302, 306, 312, 308, and 310 (FIG. 7), respectively. The C queue 412 has scheduled command nodes 406 that are scheduled to be executed (and their corresponding disc locations accessed). The waiting command nodes 408 in the B queue 416 are sorted according to a sorting operation, such as the sorting operation 506, and selectively scheduled. The C queue 412 has an LDP command node 606 corresponding to the disc location 302 (FIG. 7) accessed by the last scheduled command. For illustrative purposes it is assumed that command nodes 604, 608, 614, and 616 are 'writeback' (non-pending) commands, and command node F 612 is a read (pending) command.

Figure 7:
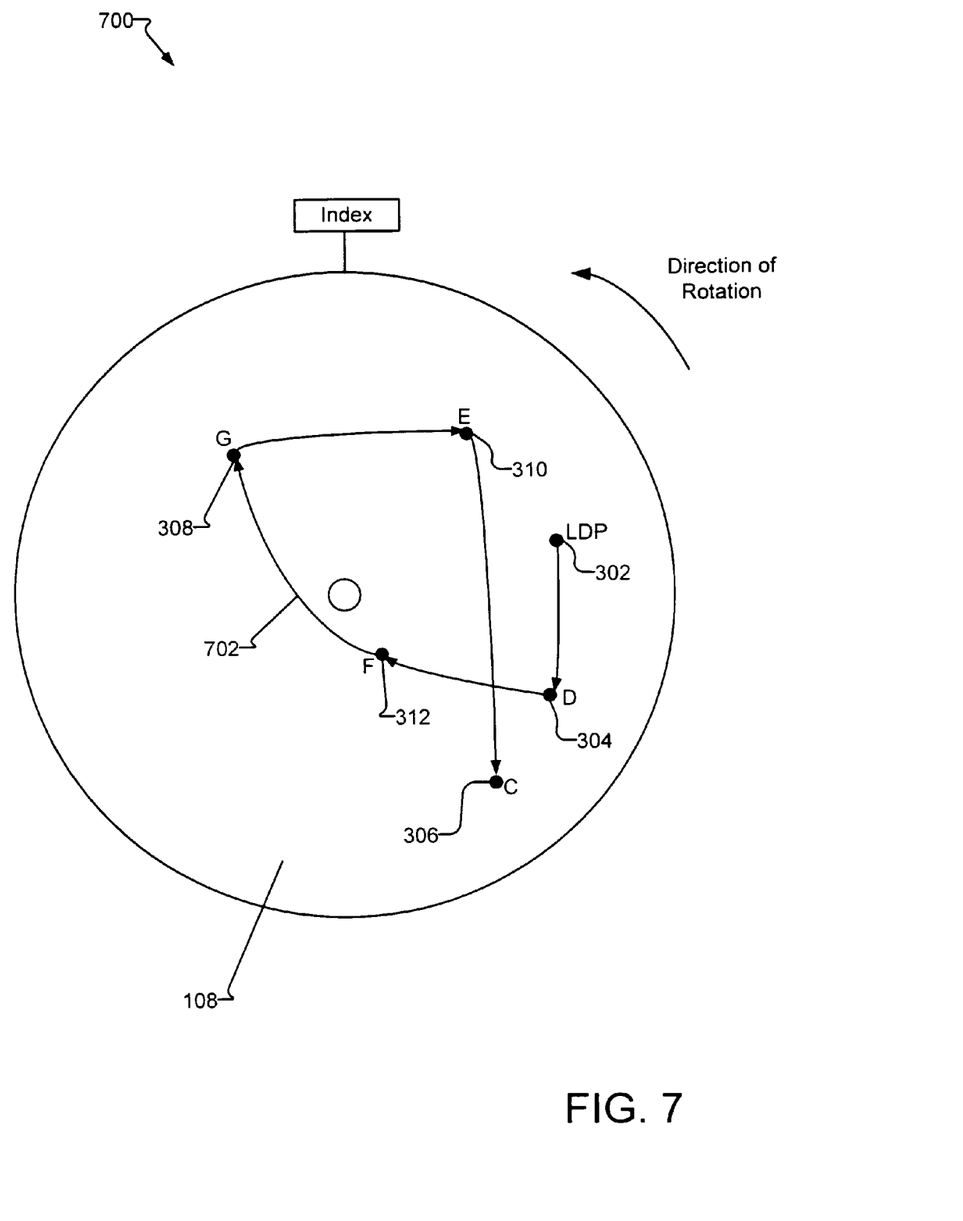
FIG. 7 is an elevation view of a disc showing exemplary disc locations associated with the command nodes of FIG. 6.

The waiting command nodes 408 are sorted according to required processing time relative to the LDP command node 606 and its LDP 302. The waiting command nodes 406 are sorted irrespective of the type of command. During sorting, for example, it is determined that command node D 604 requires the least amount of processing time starting from the LDP 302. Command node C 608 requires the next least amount of processing time starting from the LDP 302, and so on.

After the waiting command nodes 408 have been sorted, they are selectively scheduled using a "GO List" 618. The process of selectively scheduling command nodes depends on the command type associated with each waiting command node 408. It is first determined that the command node F 612 represents a read command, and is thus a pending command node. A command node F reference 624 to the command node F 612 is created in the "GO List" 618. The processing time for command node D 604 plus the processing time for the command node F 612 is not greater than a predetermined maximum processing time. Therefore, it is determined that command node D 604 can be processed in route to processing command node F 612, and a command node D reference 620 to command node D 604 is created in the "GO List" 618. When the processing time of command node C 608 is added to the processing time of command nodes F and D, 604 and 612, and compared to the predetermined allowed time, it is determined that the total processing time is greater than the allowed processing time. Therefore, a reference to command node C 608 is not created in the "GO List" 618. The process then continues to F 612 and determines that the command is a pending command. The creating, incrementing and scheduling operations 516, 518, and 520 (FIG. 5) then respectively create a pending command reference in the "GO List," increment the count in the "GO List", and schedule all the referenced nodes of the "GO List."

The process of selectively scheduling the waiting command nodes 408 next involves using the command node references 620 and 624 in the "GO List" 618 to move the corresponding command nodes 604 and 612 to the C queue 412. The 'writeback' command node D 604 is scheduled by moving 640 it to the C queue 412 at a logical position immediately after the LDP command node 606. The read command node F 612 is scheduled by moving 642 it to the C queue 412 after the command node D 630. In operation, after the LDP command node 606 is processed (and disc location 302 is accessed), the command node D 630 will be processed (and cached data will be written to the disc location 304). After the command node D 630 is processed, the read command node F 632 will be processed by reading data from the disc location 312.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts, or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto. The algorithms and/or operations illustrated and discussed herein may be implemented in microprocessor executable software. Any software language known in the art may be used, including, but not limited to, Visual Basic, C, C++, Fortran, Assembler, etc. The choice of software language may be dependent on the type of microprocessor 216 as well as other design parameters.

In summary, embodiments of the present invention may be viewed as a method of prioritizing a plurality of commands by storing (such as 422) a plurality of command nodes (such as 408) in memory (such as 210), identifying (such as 514) a pending command node (such as 408) in the plurality of command nodes (such as 408), and scheduling (such as 520, 516) the pending command node (such as 408) for processing. The method may further include identifying (such as 514,522) intermediate command nodes (such as 408) in the plurality of command nodes (such as 408) that can be processed in addition to the pending command node within a predetermined amount of time, scheduling (such as 520, 526) the intermediate command nodes for processing prior to the pending command node.

Still further, identifying (such as 514,522) intermediate command nodes that can be processed prior to the pending command node in a predetermined amount of time may include storing (such as 422) the plurality of command nodes in a first queue (such as 416), determining (such as 521) an associated required processing time from the last scheduled command node (such as 406), sorting (such as 506) the plurality of command nodes (such as 408) according to their associated required processing times, selecting (such as 526) the one or more command nodes having an aggregated processing time which, when added to the processing time of the pending command, is less than the predetermined processing time. The predetermined amount of time may be given in terms of a number of disc revolutions and in one embodiment the predetermined processing time is zero disc revolutions.

Embodiments may be viewed as a command prioritization module (such as 232) that receives a pending command (such as 612) and non-pending commands (such as 604, 608), and schedules the pending command (such as 612) and one or more of the non-pending commands (such as 604, 608) if processing time associated with all the one or more non-pending command(s) (such as 604, 608) and the pending command (such as 612) is less than a predetermined allowed time. The command prioritization module (such as 232) may include a first command queue (such as 402) having command nodes (such as 404) associated with a set of most recently received commands, a second command queue (such as 416) having one or more command nodes (such as 406) to be scheduled, a third command queue (such as 412) having one or more scheduled command nodes (such as 406). Executable software or a state machine may sort (such as 506) all of the pending and non-pending command nodes in the second command queue (such as 416) according to processing time from a last scheduled command, identify a pending command (such as 612) in the second command queue (such as 416), calculate (such as 521) a total processing time for one or more of the plurality of non-pending commands and pending command, and schedule (such as 520) the pending command and one or more of the non-pending commands if the total processing time is less than the predetermined allowed time.

Further yet, an embodiment may be viewed as a prioritization module (such as 232) for a data storage device (such as 100) including a set of queues (such as 402, 416, 412) holding command nodes (such as 406) representing commands received by the data storage device (such as 100), and a means (such as 216, 224, 202) for prioritizing command nodes giving preference to one or more pending command(s). The queues (such as 402, 416, 412) of the prioritization module (such as 232) may include a first queue (such as 402) holding command nodes representing new commands received by the data storage device, a second queue (such as 416) receiving the command nodes from the first queue (such as 402), a third queue (such as 412) holding pending command nodes received from the second queue (such as 416).

It will be clear that the present invention is well adapted to attain the ends and advantages mentioned as well as those inherent therein. While a presently preferred embodiment has been described for purposes of this disclosure, various changes and modifications may be made that are well within the scope of the present invention. For example, the scheduling operation 520 may initialize the "GO List" and "GO List" counter after the scheduling, so that upon reentry into the operational flow 500, the "GO List" is already initialized. Numerous other changes may be made that will readily suggest themselves to those skilled in the art and that are encompassed in the spirit of the invention disclosed and as defined in the appended claims.

What is claimed is:

1. An apparatus for prioritizing the execution of data transfers into or out of a cache memory, the apparatus comprising:
    a cache memory that receives blocks of data for temporary storage, wherein each received data block is associated with a data transfer command sent by a command device; and
    a scheduler that schedules transfers of blocks of data between the cache memory and a data storage device (DSD), and schedules transfers of blocks of data between the cache memory and the command device, wherein the scheduler assigns a higher level priority to transferring a first data block associated with a first data transfer command, for which the apparatus does not need to return a status indicating that the first data block has been stored in the cache memory, than it assigns to transferring a second data block associated with a second data transfer command, for which the apparatus needs to return a status indicating that the second data block has been stored in the cache memory.

2. The apparatus of claim 1, wherein the cache memory comprises a plurality of addressable volatile memory locations.

3. The apparatus of claim 1, wherein the cache memory comprises a second DSD.

4. The apparatus of claim 1, wherein the DSD comprises a disc drive.

5. The apparatus of claim 1, wherein the command device comprises a non-volatile memory device.

6. The apparatus of claim 1, wherein the command device comprises a host computer.

7. The apparatus of claim 1, wherein the command device comprises a microprocessor.

8. The apparatus of claim 1, wherein the first command comprises an instruction to transfer the first data block from the command device to the DSD.

9. The apparatus of claim 1, wherein the first command comprises an instruction to transfer the first data block from the DSD to the command device.

10. The apparatus of claim 1, wherein the scheduler selects data for a next data transfer into or out of the cache memory, and the selected data comprises a next data block that is associated with the first command.

11. A memory cache management system comprising the apparatus of claim 1.

12. A data channel comprising the apparatus of claim 1.

13. A read channel comprising the apparatus of claim 1.

14. A data handling system comprising the apparatus of claim 1.

15. An information retrieval system comprising the apparatus of claim 1.

16. A memory access device comprising the apparatus of claim 1.

17. A method of prioritizing the execution of data transfers into or out of a cache, the method comprising:
    receiving blocks of data for temporary storage in the cache, each received data block being associated with a data transfer command sent by a command device;
    assigning a higher level of priority to each data transfer command that requires interaction with the command device and that does not need to return a status indicating that an associated data block has been stored in the cache; and
    assigning a lower level of priority to each data transfer command that does not require interaction with the command device and that needs to return a status indicating that an associated data block has been stored in the cache,
    wherein the higher level priority takes precedence over the lower level priority.

18. The apparatus of claim 1, wherein the second command includes at least one writeback command.

19. The method of claim 17, wherein at least one data transfer command comprises an instruction to transfer data from the command device to a data storage device.

20. The method of claim 17, wherein at least one data transfer command comprises an instruction to transfer data form a data storage device to the command device.

21. A computer-readable device storing instructions that, when executed, cause a processor to perform operations to prioritize the execution of data transfers into or out of a cache, the operations comprising:
    receive blocks of data for temporary storage in the cache, each received data block being associated with a data transfer command sent by a command device;
    assign a higher level of priority to each data transfer command that requires interaction with the command device and that does not need to return a status indicating that an associated data block has been stored in the cache; and
    assign a lower level of priority to each data transfer command that does not require interaction with the command device and that needs to return a status indicating that an associated data block has been stored in the cache,
    wherein the higher level priority takes precedence over the lower level priority.

22. The computer-readable device of claim 21, wherein at least one data transfer command comprises an instruction to transfer data from the command device to a data storage device.

23. The computer-readable device of claim 21, wherein at least one data transfer command comprises an instruction to transfer data from a data storage device to the command device.

* * * * *